(12) United States Patent
Ozaki et al.

(10) Patent No.: US 9,630,645 B2
(45) Date of Patent: Apr. 25, 2017

(54) TELESCOPIC SHAFT AND STEERING SYSTEM

(71) Applicants: JTEKT CORPORATION, Osaka (JP); KOYO MACHINE INDUSTRIES CO., LTD., Yao-shi, Osaka (JP)

(72) Inventors: Mitsuharu Ozaki, Kashiba (JP); Daiki Yano, Shiki-gun (JP); Kazuhide Honda, Okazaki (JP); Yasutaka Fukumoto, Toyota (JP); Osamu Honda, Fujiidera (JP)

(73) Assignees: JTEKT CORPORATION, Osaka-shi (JP); KOYO MACHINE INDUSTRIES CO., LTD., Yao-shi (JP)

( * ) Notice: Subject to any disclaimer, the term of this patent is extended or adjusted under 35 U.S.C. 154(b) by 0 days.

(21) Appl. No.: 14/979,678

(22) Filed: Dec. 28, 2015

(65) Prior Publication Data

US 2016/0185379 A1   Jun. 30, 2016

(30) Foreign Application Priority Data

Dec. 25, 2014  (JP) .................................. 2014-262871

(51) Int. Cl.
*B62D 1/185* (2006.01)
*B62D 1/19* (2006.01)
(Continued)

(52) U.S. Cl.
CPC ................. *B62D 1/20* (2013.01); *B62D 1/16* (2013.01); *B62D 1/185* (2013.01); *B62D 1/192* (2013.01);
(Continued)

(58) Field of Classification Search
CPC ......... F16D 3/065; B62D 1/185; B62D 1/192; B62D 1/20; F16C 3/035; F16C 29/04
See application file for complete search history.

(56) References Cited

U.S. PATENT DOCUMENTS 6,510,756 B2 * 1/2003 Aota ...................... B62D 1/192
                                                           280/777
7,322,607 B2 * 1/2008 Yamada ................... B62D 1/16
                                                           280/755
(Continued)

FOREIGN PATENT DOCUMENTS

JP       2000205288 A  *  7/2000
JP       2005083531 A  *  3/2005
(Continued)

*Primary Examiner* — Laura Freedman
(74) *Attorney, Agent, or Firm* — Oliff PLC

(57) ABSTRACT

A telescopic shaft includes an inner shaft, an outer shaft, a plurality of rolling bodies that are disposed between recessed grooves of the inner shaft and the outer shaft and form a line in an axial direction, a stopper, and a buffer body. The stopper restricts falling of the rolling bodies from the recessed groove of the inner shaft. The buffer body is interposed between the stopper and a rolling body at an end portion of the line. An end surface of the buffer body includes an inclined abutment portion that is inclined with respect to a plane perpendicular to an axis of the inner shaft. The abutment portion abuts against the rolling body at the end portion of the line at a stroke end of the inner shaft with respect to the outer shaft.

6 Claims, 3 Drawing Sheets

(51) Int. Cl.
  *B62D 1/20* (2006.01)
  *F16D 3/06* (2006.01)
  *F16C 3/035* (2006.01)
  *F16C 29/04* (2006.01)
  *B62D 1/16* (2006.01)
(52) U.S. Cl.
  CPC .............. *F16C 3/035* (2013.01); *F16C 29/04* (2013.01); *F16D 3/065* (2013.01)

(56) References Cited

U.S. PATENT DOCUMENTS

| | | | | |
|---|---|---|---|---|
| 7,753,800 | B2* | 7/2010 | Tokioka | B62D 1/185 384/54 |
| 8,157,659 | B2* | 4/2012 | Kakutani | B62D 1/16 464/167 |
| 8,342,056 | B2* | 1/2013 | Tokioka | B62D 1/16 74/493 |
| 8,931,805 | B2* | 1/2015 | Buzzard | F16D 3/065 280/775 |
| 2009/0203455 | A1* | 8/2009 | Tokioka | B62D 1/16 464/167 |
| 2016/0131196 | A1* | 5/2016 | Miyawaki | B62D 1/20 464/167 |
| 2016/0185378 | A1* | 6/2016 | Kamimura | F16C 3/035 74/493 |

FOREIGN PATENT DOCUMENTS

| | | | |
|---|---|---|---|
| JP | 2005083532 A | * | 3/2005 |
| JP | 2007016901 A | * | 1/2007 |
| JP | 2007024122 A | * | 2/2007 |
| JP | 2007247846 A | * | 9/2007 |
| JP | 2007255546 A | * | 10/2007 |
| JP | 2009-197818 A | | 9/2009 |
| JP | 2010-053943 A | | 3/2010 |

* cited by examiner

TELESCOPIC SHAFT AND STEERING SYSTEM

INCORPORATION BY REFERENCE

The disclosure of Japanese Patent Application No. 2014-262871 filed on Dec. 25, 2014 including the specification, drawings and abstract is incorporated herein by reference in its entirety.

BACKGROUND OF THE INVENTION

1. Field of the Invention

The invention relates to a telescopic shaft and a steering system.

2. Description of Related Art

Japanese Patent Application Publication No. 2010-053943 proposes a telescopic shaft in which a coil spring is disposed between a washer disposed at a distal end portion of an inner shaft, and a ball. Japanese Patent Application Publication No. 2009-197818 proposes a telescopic shaft in which a spring plate is interposed between a washer fixed to a shaft end of a male shaft by crimping, and a washer facing a ball.

SUMMARY OF THE INVENTION

In each of JP 2010-053943 A and JP 2009-197818 A, a collision load of the ball is buffered only in an axial direction of the telescopic shaft when the telescopic shaft is fully extended. Thus, a buffer effect is not high. Therefore, striking sound is generated when the telescopic shaft is fully extended, and noise is caused in a steering system or the like to which the telescopic shaft is applied. The invention provides a telescopic shaft having a high buffer effect, and a steering system including the telescopic shaft.

A first aspect of the invention is a telescopic shaft including: an inner shaft where a first recessed groove that extends in an axial direction is formed in an outer peripheral surface; an outer shaft where a second recessed groove that extends in the axial direction is formed in an inner peripheral surface; a plurality of rolling bodies that are disposed between the first recessed groove and the second recessed groove, and form a line in the axial direction; a stopper that restricts falling of a rolling body at an end portion of the line from the first recessed groove at a stroke end of the inner shaft with respect to the outer shaft; and a buffer body that is interposed between the stopper and the rolling body at the end portion of the line, wherein an inclined abutment portion that is inclined with respect to a plane perpendicular to an axis of the inner shaft, and abuts against the rolling body at the end portion of the line at the stroke end is provided at an end surface of the buffer body facing the rolling body at the end portion of the line.

In the above aspect, a pair of first recessed grooves facing each other in a direction perpendicular to the axis, and a pair of second recessed grooves facing each other in the axis-perpendicular direction may be provided as the recessed grooves in the inner shaft and the outer shaft, respectively; a pair of stoppers, each of which restricts falling of the rolling body from the corresponding first recessed groove, may be provided as the stopper; a pair of buffer bodies, each of which is interposed between the corresponding stopper and the rolling body at the end portion of the corresponding line, may be provided as the buffer body; and a buffer body unit integrally including the pair of buffer bodies, and a connection portion that connects the pair of buffer bodies may be provided. In accordance with the above configuration, each of the pair of buffer bodies buffers collision energy received by the other buffer body through the connection portion. Accordingly, the buffer effect can be further increased. Also, by collectively handling the pair of buffer bodies, ease of assembly is improved.

The connection portion may be elastically deformable. Since the connection portion is elastically deformed, the buffer effect can be further increased. The buffer body unit may include an engagement portion that engages with the inner shaft so as to tentatively hold the buffer body unit on the inner shaft. In accordance with the configuration, the buffer body unit is tentatively held on the inner shaft during assembly. Thus, the ease of assembly is improved. The telescopic shaft may further include a pin that is inserted and held in an axis-perpendicular-direction hole of the inner shaft, wherein a pair of end portions of the pin may be inserted through pin insertion holes of the pair of buffer bodies, respectively, to support the pair of buffer bodies, and constitute the pair of stoppers. In accordance with the configuration, each of the pair of end portions of the pin that is inserted and held in the axis-perpendicular-direction hole of the inner shaft supports the corresponding buffer body, and constitutes the corresponding stopper. Therefore, a simplified structure can be achieved.

The abutment portion may include an inclined surface that is inclined with respect to the axis-perpendicular plane. In accordance with the configuration, it is possible to disperse the collision load of the rolling body by the inclined surface in the collision of the rolling body. The abutment portion may have an annular shape surrounding a recessed portion provided in the end surface of the buffer body, and a diameter of the abutment portion may be elastically widened. In accordance with the configuration, the buffer effect can be increased since the diameter of the annular abutment portion surrounding the recessed portion is elastically widened in the collision of the rolling body.

A second aspect of the invention is a steering system including an intermediate shaft composed of the telescopic shaft of the first aspect. In accordance with the aspect, it is possible to provide the steering system in which noise caused by striking sound of the intermediate shaft is suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
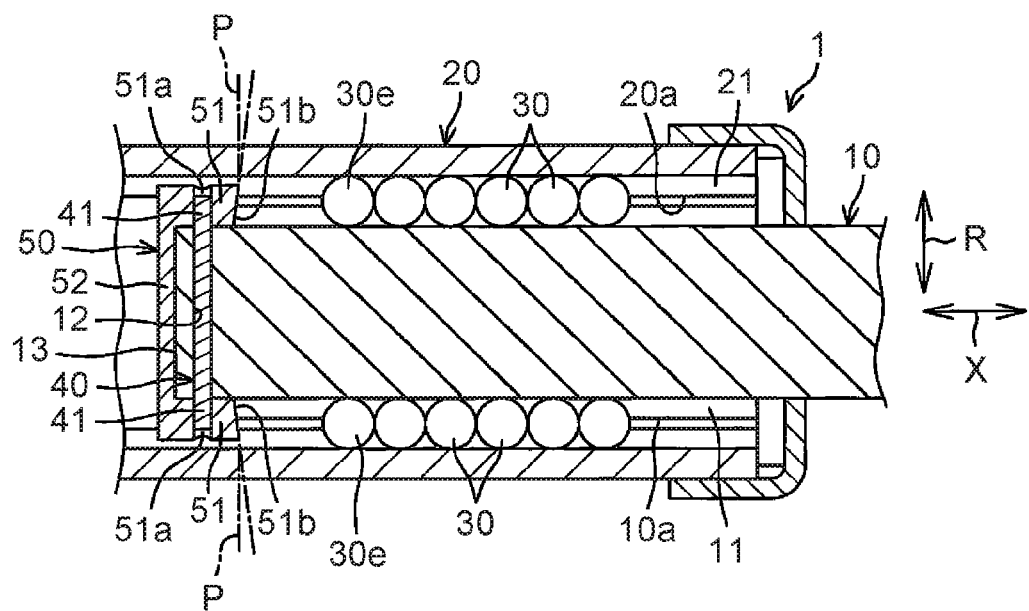
FIG. 1 is a sectional view of a main portion of a telescopic shaft according to a first embodiment of the invention.

Embodiments of the invention will be described by reference to the accompanying drawings. FIG. 1 is a sectional view of a main portion of a telescopic shaft according to a first embodiment of the invention. As shown in FIG. 1, a telescopic shaft 1 includes an inner shaft 10 where a recessed groove 11 (a first recessed groove) that extends in an axial direction X is formed in an outer peripheral surface 10a, and an outer shaft 20 where a recessed groove 21 (a second recessed groove) that extends in the axial direction X is formed in an inner peripheral surface 20a. The telescopic shaft 1 also includes a plurality of rolling bodies 30 that are disposed between the recessed grooves 11, 21 of the inner shaft 10 and the outer shaft 20, and form a line in the axial direction X. For example, the rolling bodies 30 are metal balls.

Figure 2:
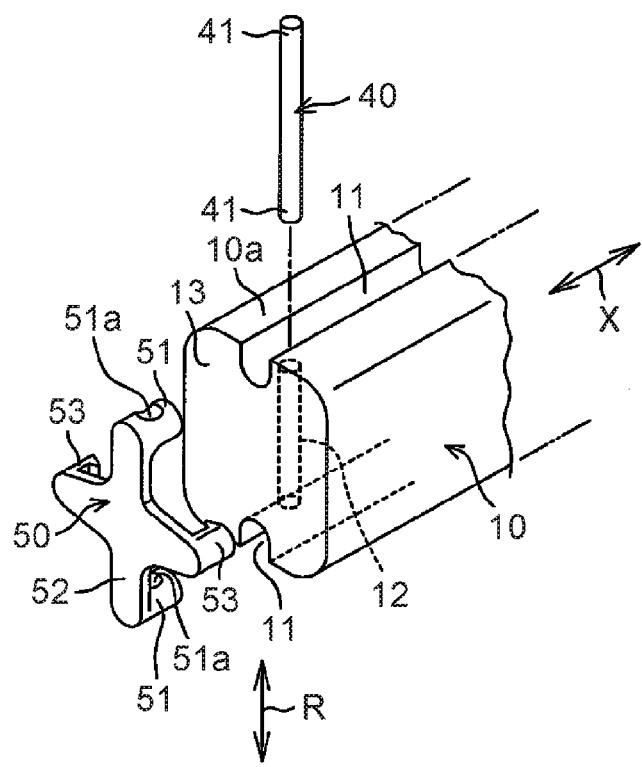
FIG. 2 is an exploded perspective view of an inner shaft, a pin having a stopper function, and a buffer body unit.

A pair of recessed grooves 11 facing each other in a direction R perpendicular to an axis are provided in the inner shaft 10. A pair of recessed grooves 21 facing each other in the axis-perpendicular direction R are provided in the outer shaft 20. The plurality of rolling bodies 30 are interposed between one of the recessed grooves 11 and the corresponding recessed groove 21 so as to form a line, and the plurality of rolling bodies 30 are also interposed between the other of the recessed grooves 11 and the corresponding recessed groove 21 so as to form a line. As shown in FIG. 2 that is an exploded perspective view, the inner shaft 10 includes an axis-perpendicular-direction hole 12 that extends in the axis-perpendicular direction R such that opposite ends of the axis-perpendicular-direction hole 12 open in bottoms of the pair of recessed grooves 11. As shown in FIG. 1, a pin 40 is inserted and held in the axis-perpendicular-direction hole 12. To be more specific, the pin 40 is press-fitted into the axis-perpendicular-direction hole 12. Each of end portions of the pin 40 projects into the corresponding recessed groove 11 from the axis-perpendicular-direction hole 12 to constitute a pair of stoppers 41.

Figures 4A, 4B:
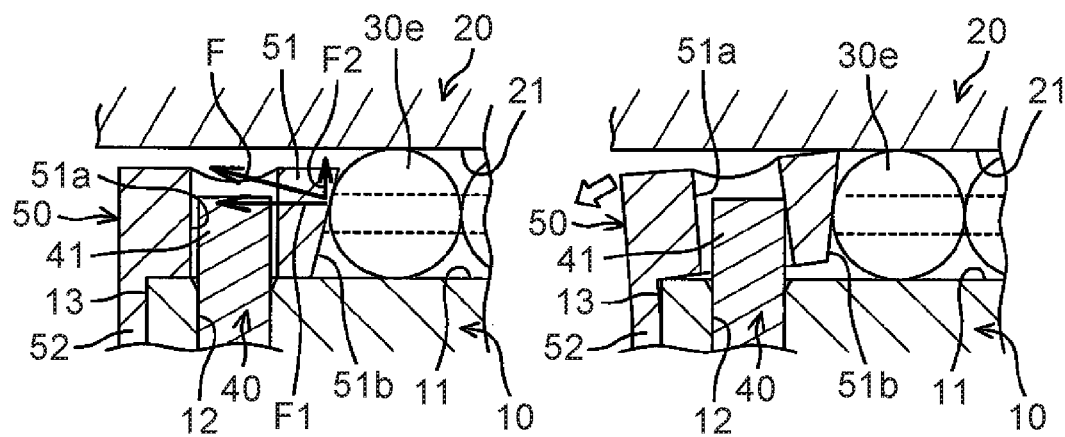
FIG. 4A is an enlarged sectional view of a main portion of the telescopic shaft sequentially illustrating a buffering operation.
FIG. 4B is an enlarged sectional view of the main portion of the telescopic shaft sequentially illustrating a buffering operation.

When the inner shaft 10 reaches a stroke end on an extended side (a right side in FIG. 1) with respect to the outer shaft 20 in FIG. 1, each of the stoppers 41 restricts falling of a rolling body 30e at an end portion of the corresponding line from the corresponding recessed groove 11 of the inner shaft 10 as shown in FIGS. 4A, 4B. The stopper 41 receives the rolling body 30e at the end portion of the line while absorbing an impact via a buffer body 51. To be more specific, the telescopic shaft 1 includes a buffer body unit 50 including a pair of buffer bodies 51 as shown in FIG. 2.

The buffer body unit 50 is a unit that includes the pair of buffer bodies 51, a connection portion 52 that connects the pair of buffer bodies 51, and a pair of engagement arms 53, as an engagement portion, that extend from an intermediate portion of the connection portion 52 to opposite sides from each other in a direction different from the connection portion 52. The buffer body unit 50 is integrally formed of a single material. The buffer body unit 50 is formed by an elastic body. The buffer body unit 50 is formed of resin, rubber, or metal.

As shown in FIG. 1, each of the buffer bodies 51 is interposed between each of the stoppers 41 and the rolling body 30e at the end portion of the corresponding line. The connection portion 52 faces a shaft end surface 13 of the inner shaft 10. The connection portion 52 is elastically deformable such as bending deformation. Each of the buffer bodies 51 is a cylindrical member that extends in the axial direction X from each end of the connection portion 52. Each of the buffer bodies 51 is disposed between the corresponding recessed grooves 11, 21. Each of the buffer bodies 51 has a pin insertion hole 51a through which the corresponding end portion (the stopper 41) of the pin 40 is inserted.

Each of the buffer bodies 51 also includes an end surface facing the rolling body 30e at the end portion of the corresponding line. The end surface has an abutment portion 51b that abuts against the rolling body 30e at the end portion of the corresponding line at the stroke end on the extended side of the inner shaft 10. As shown in FIG. 4A, the abutment portion 51b is an inclined surface that is inclined with respect to a plane P perpendicular to the axis of the inner shaft 10. Each of the pair of engagement arms 53 is a hook-like body having a substantially L shape. The pair of engagement arms 53 elastically clamp axis-perpendicular-direction facing portions of the outer peripheral surface 10a of the inner shaft 10 by a restoring force of the engagement arms 53 in a state in which the engagement arms 53 are elastically widened.

Figure 3:
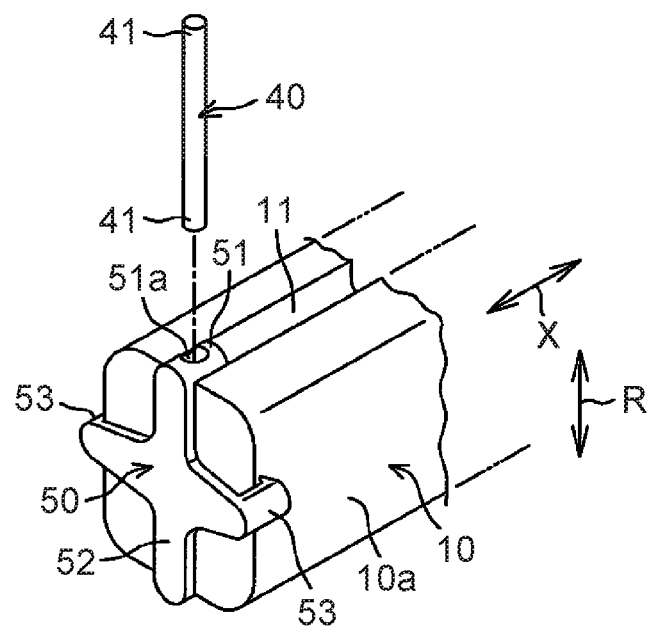
FIG. 3 is an exploded perspective view of the inner shaft on which the buffer body unit is tentatively held, and the pin.

As shown in FIG. 3, the pair of engagement arms 53 engage with the outer peripheral surface 10a of the inner shaft 10 so as to tentatively hold the buffer body unit 50 on the inner shaft 10 in a stage before the pin 40 is attached to the inner shaft 10 when the telescopic shaft 1 is assembled. In a state in which the buffer body unit 50 is tentatively held on the inner shaft 10 as described above, the pin 40 is press-fitted into the axis-perpendicular-direction hole 12 (see FIG. 2) of the inner shaft 10 so as to be inserted through the pin insertion holes 51a of the pair of buffer bodies 51.

In accordance with the present embodiment, when the rolling body 30e at the end portion of the line moving in the axial direction X collides with the inclined abutment portion 51b at the end surface of the buffer body 51 at the stroke end on the extended side of the inner shaft 10, a load F of the collision is dispersed into a load component F1 in the axial direction X, and a load component F2 in a dispersion direction Y that is a direction other than the axial direction X, and is thereby relieved. Accordingly, a buffer effect can be increased. Consequently, noise caused by striking sound when the telescopic shaft 1 is fully extended can be reduced.

If the pin receives the rolling body at the end portion of the line directly or via a washer as described in JP 2010-053943 A at the stroke end on the extended side of the inner shaft (that is, in a fully-extended state of the telescopic shaft), so-called biting in which rolling of the rolling body is restricted by the pin or the washer may occur. Thus, the telescopic shaft may be locked in the fully-extended state, or an extension and contraction load of the telescopic shaft may be increased. In contrast, in the present embodiment, since the buffer body 51 is interposed between the stopper 41 and the rolling body 30e at the end portion of the line, it is possible to suppress the occurrence of the locking and the increase in the extension and contraction load when the telescopic shaft is fully extended.

Also, the buffer body unit 50 integrally including the pair of buffer bodies 51 and the connection portion 52 that connects the pair of buffer bodies 51 is also provided. Therefore, each of the pair of buffer bodies 51 buffers collision energy received by the other buffer body 51 through the connection portion 52. Accordingly, the buffer effect can be further increased. Also, by collectively handling the pair of buffer bodies 51 as the integrated buffer body unit 50 when the telescopic shaft 1 is assembled, ease of assembly is improved.

When the collision energy is buffered, the connection portion 52 is elastically deformed by bending as indicated by an outlined arrow in FIG. 4B. Thus, the buffer effect can be further increased. The buffer body unit 50 is tentatively held on the inner shaft 10 by using the engagement arms 53 during assembly as shown in FIG. 3. Thus, the ease of assembly is improved. Each of the end portions of the pin 40 that is inserted and held in the axis-perpendicular-direction hole 12 of the inner shaft 10 supports the corresponding buffer body 51, and constitutes the corresponding stopper 41 as shown in FIG. 1. Therefore, a simplified structure can be achieved.

It is also possible to disperse the collision load of the rolling body 30e by the inclined surface formed by the abutment portion 51b when the abutment portion 51b and the rolling body 30e at the end portion of the line collide with each other.

Figure 5A:
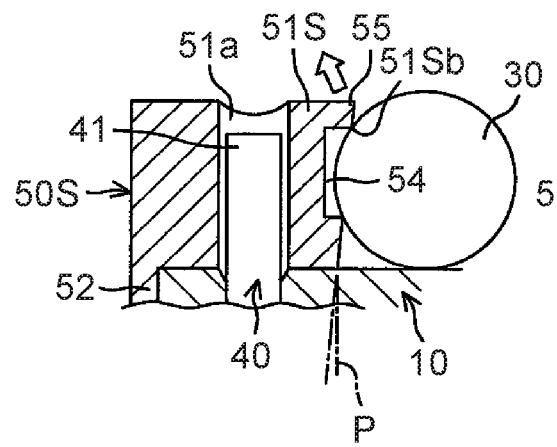
FIG. 5A is a schematic sectional view of a region around a buffer body in a second embodiment of the invention.

FIG. 5A is a schematic sectional view of a region around a buffer body 51S in a second embodiment of the invention. The second embodiment in FIG. 5A differs from the first embodiment in FIG. 4A mainly in the following point. That is, a recessed portion 54 and an annular wall 55 that surrounds the recessed portion 54 are provided at an inclined end surface that is inclined with respect to the axis-perpendicular plane P in the buffer body 51S of a buffer body unit 50S. An inner peripheral edge of the annular wall 55 constitutes an annular abutment portion 51Sb. The annular abutment portion 51 Sb is elastically deformable such that a diameter of the abutment portion 51Sb is widened together with the annular wall 55 (see an outlined arrow).

The same constituent elements as the constituent elements of the first embodiment in FIG. 4A out of constituent elements of the second embodiment in FIG. 5A are assigned the same reference numerals as the reference numerals of the constituent elements of the first embodiment in FIG. 4A. In accordance with the second embodiment, the same effects as those of the first embodiment can be produced, and additionally, the buffer effect can be further increased since the diameter of the abutment portion 51Sb itself is elastically widened.

Figure 5B:
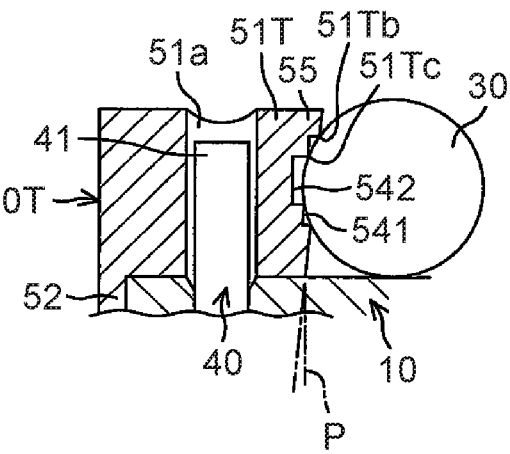
FIG. 5B is a schematic sectional view of a region around a buffer body in a third embodiment of the invention.

FIG. 5B is a schematic sectional view of a region around a buffer body 51T in a third embodiment of the invention. The third embodiment in FIG. 5B differs from the second embodiment in FIG. 5A in that two-stage recessed portions 541, 542, and two-stage annular abutment portions 51Tb, 51Tc are provided at an inclined end surface that is inclined with respect to the axis-perpendicular plane P in the buffer body 51T of a buffer body unit 50T. Accordingly, the buffer effect is further increased.

The same constituent elements as the constituent elements of the second embodiment in FIG. 5A out of constituent elements of the third embodiment in FIG. 5B are assigned the same reference numerals as the reference numerals of the constituent elements of the second embodiment in FIG. 5A.

Figure 6:
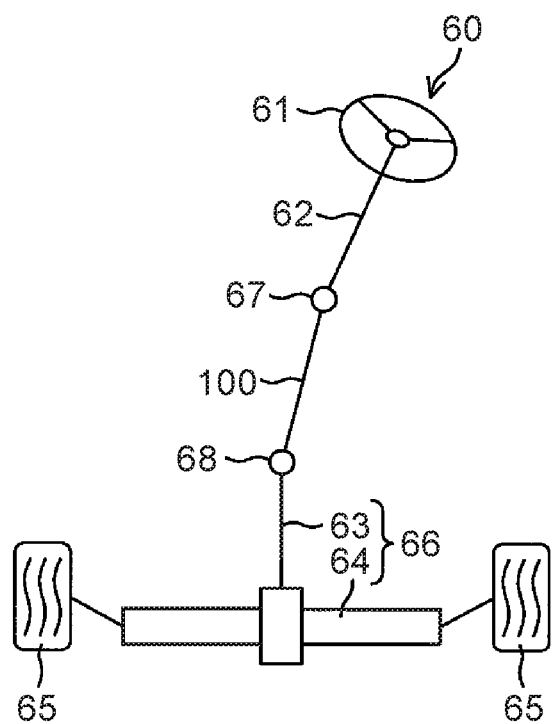
FIG. 6 is a schematic view of a steering system according to a fourth embodiment of the invention in which the telescopic shaft is applied to an intermediate shaft of the steering system.

The telescopic shaft of each of the first to third embodiments may be applied to an intermediate shaft 100 of a steering system 60 as shown in FIG. 6.

To be more specific, the steering system 60 includes a steering shaft 62 where a steering wheel 61 is connected to one end, a steering mechanism 66 that is composed of a rack-and-pinion mechanism including a pinion shaft 63 and a rack shaft 64, and steers steered wheels 65, and the intermediate shaft 100 that is interposed between the steering shaft 62 and the pinion shaft 63 to transmit steering torque.

One end of the intermediate shaft 100 is connected to the steering shaft 62 via a universal joint 67. The other end of the intermediate shaft 100 is connected to the pinion shaft 63 via a universal joint 68. One of the inner shaft and the outer shaft of the telescopic shaft constituting the intermediate shaft 100 is positioned on an upper side, and the other is positioned on a lower side. In accordance with the present embodiment, noise caused by striking sound regarding the intermediate shaft 100 can be reduced.

The invention is not limited to the above embodiments. For example, although the pair of buffer bodies constitute the integrated buffer body unit in the above embodiments, the invention is not limited thereto. The pair of buffer bodies may be provided independently of each other.

What is claimed is:

1. A telescopic shaft comprising:
   an inner shaft where a first recessed groove that extends in an axial direction is formed in an outer peripheral surface;
   an outer shaft where a second recessed groove that extends in the axial direction is formed in an inner peripheral surface;
   a plurality of rolling bodies that are disposed between the first recessed groove and the second recessed groove, and form a line in the axial direction;
   a stopper that restricts falling of a rolling body at an end portion of the line from the first recessed groove at a stroke end of the inner shaft with respect to the outer shaft; and
   a buffer body that is interposed between the stopper and the rolling body at the end portion of the line, wherein
   an inclined abutment portion that is inclined with respect to a plane perpendicular to an axis of the inner shaft, and abuts against the rolling body at the end portion of the line at the stroke end is provided at an end surface of the buffer body facing the rolling body at the end portion of the line,
   a pair of first recessed grooves facing each other in a direction perpendicular to the axis, and a pair of second recessed grooves facing each other in the axis-perpendicular direction are provided as the recessed grooves in the inner shaft and the outer shaft, respectively,
   a pair of stoppers, each of which restricts falling of the rolling body from the corresponding first recessed groove, are provided as the stopper,
   a pair of buffer bodies, each of which is interposed between the corresponding stopper and the rolling body at the end portion of the corresponding line, are provided as the buffer body,
   a buffer body unit integrally including the pair of buffer bodies, and a connection portion that connects the pair of buffer bodies is provided, and
   the buffer body unit includes an engagement portion that engages with the inner shaft so as to tentatively hold the buffer body unit on the inner shaft.

2. The telescopic shaft according to claim 1, wherein the connection portion is elastically deformable.

3. The telescopic shaft according to claim 1, further comprising a pin that is inserted and held in an axis-perpendicular-direction hole of the inner shaft,
   wherein a pair of end portions of the pin are inserted through pin insertion holes of the pair of buffer bodies, respectively, to support the pair of buffer bodies, and constitute the pair of stoppers.

4. The telescopic shaft according to claim 1, wherein the abutment portion includes an inclined surface that is inclined with respect to the axis-perpendicular plane.

5. The telescopic shaft according to claim 1, wherein the abutment portion has an annular shape surrounding a recessed portion provided in the end surface of the buffer body, and a diameter of the abutment portion is elastically widened.

6. A steering system comprising an intermediate shaft composed of a telescopic shaft according to claim 1.

* * * * *